(12) United States Patent
Boutaghou et al.

(10) Patent No.: US 6,501,606 B2
(45) Date of Patent: Dec. 31, 2002

(54) FLY HEIGHT CONTROL FOR A READ/WRITE HEAD OVER PATTERNED MEDIA

(75) Inventors: Zine Eddine Boutaghou, Vadnais Heights, MN (US); Anthony P. Sannino, Shakopee, MN (US); Derek A. Lewis, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/726,906

(22) Filed: Nov. 30, 2000

(65) Prior Publication Data
US 2001/0030822 A1 Oct. 18, 2001

Related U.S. Application Data
(60) Provisional application No. 60/168,855, filed on Dec. 2, 1999.

(51) Int. Cl.$^7$ .............................................. G11B 5/02
(52) U.S. Cl. ........................... 360/25; 360/75; 360/53; 360/291.9; 360/78.09
(58) Field of Search ......................... 360/25, 75, 77.08, 360/78.14, 53, 294.7, 246.3, 291.9, 294.4, 135, 78.09

(56) References Cited

U.S. PATENT DOCUMENTS

| | | | |
|---|---|---|---|
| 3,732,552 A | 5/1973 | Walraven | |
| 4,340,956 A | 7/1982 | Miller | |
| 4,605,977 A | 8/1986 | Matthews | |
| 4,669,011 A | 5/1987 | Lemke | |
| 4,853,810 A | 8/1989 | Pohl et al. | |
| 4,905,107 A | 2/1990 | Klein | |
| 4,931,887 A | 6/1990 | Hegde et al. | |
| 5,021,906 A | 6/1991 | Chang et al. | |
| 5,276,573 A | 1/1994 | Harada et al. | |
| 5,377,058 A | * 12/1994 | Good et al. | 360/75 |
| 5,410,439 A | * 4/1995 | Egbert et al. | 360/75 |
| 5,412,519 A | 5/1995 | Buettner et al. | |
| 5,495,372 A | 2/1996 | Bahlmann et al. | |
| 5,528,922 A | 6/1996 | Baumgart et al. | |
| 5,537,269 A | 7/1996 | Zarouri et al. | |
| 5,589,996 A | 12/1996 | Patrick et al. | |
| 5,677,808 A | 10/1997 | Cha et al. | |
| 5,708,540 A | 1/1998 | Ananth et al. | |
| 5,764,432 A | 6/1998 | Kasahara | |
| 5,796,558 A | 8/1998 | Hanrahan et al. | |
| 5,805,384 A | 9/1998 | Bronshvatch et al. | |
| 5,838,514 A | * 11/1998 | Smith et al. | 360/77.03 |
| 5,856,896 A | 1/1999 | Berg et al. | |
| 5,870,251 A | 2/1999 | Boutaghou | |
| 5,898,541 A | 4/1999 | Boutaghou et al. | |
| 5,943,189 A | 8/1999 | Boutaghou et al. | |
| 6,002,549 A | 12/1999 | Berman et al. | |
| 6,005,736 A | 12/1999 | Schreck | |
| 6,108,175 A | 8/2000 | Hawwa et al. | |
| 6,118,637 A | 9/2000 | Wright et al. | |
| 6,139,936 A | * 10/2000 | Weiss | 360/135 |

* cited by examiner

Primary Examiner—Alan T. Faber

(57) ABSTRACT

According to one embodiment of the present invention, a fly height of a read/write head in a disc drive is actively controlled as the read/write head is positioned over a rotating disc with a patterned media. The patterned media includes ridges and grooves in servo wedges in the patterned media. According to another embodiment of the present invention, an estimated fly height of the read/write head is compared with a desired fly height to generate a control signal. The control signal is used to apply a voltage difference across a piezoelectric layer joining the read/write head to a slider to move the read/write head relative to the slider and adjust the fly height of the read/write head. According to another embodiment of the present invention, a map of ridges and grooves in the patterned media is generated and the fly height of the read/write head is actively controlled based on information in the map.

14 Claims, 9 Drawing Sheets

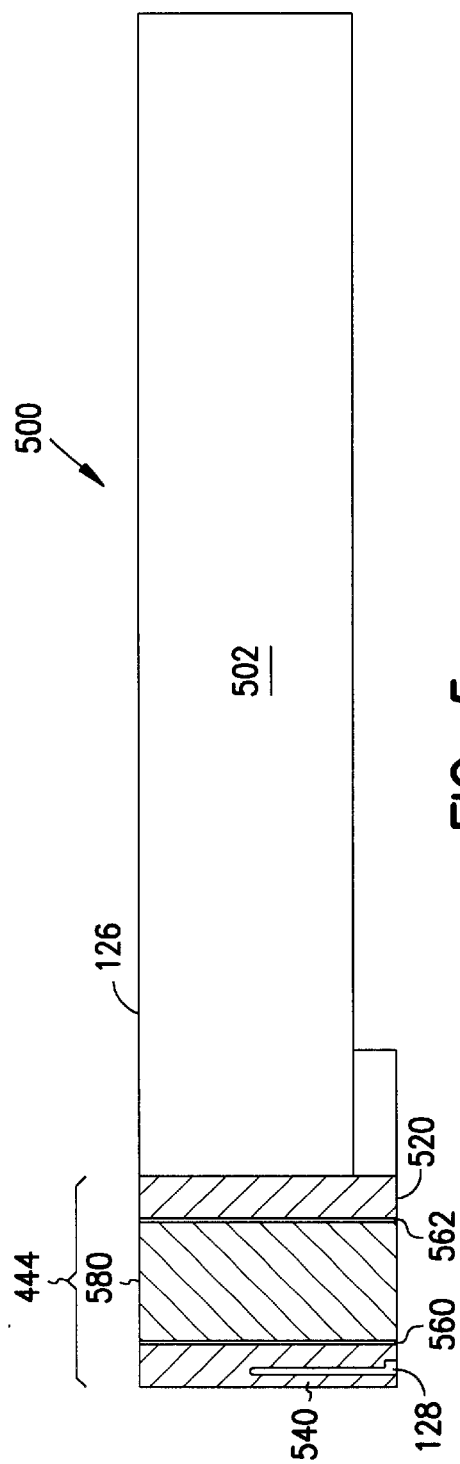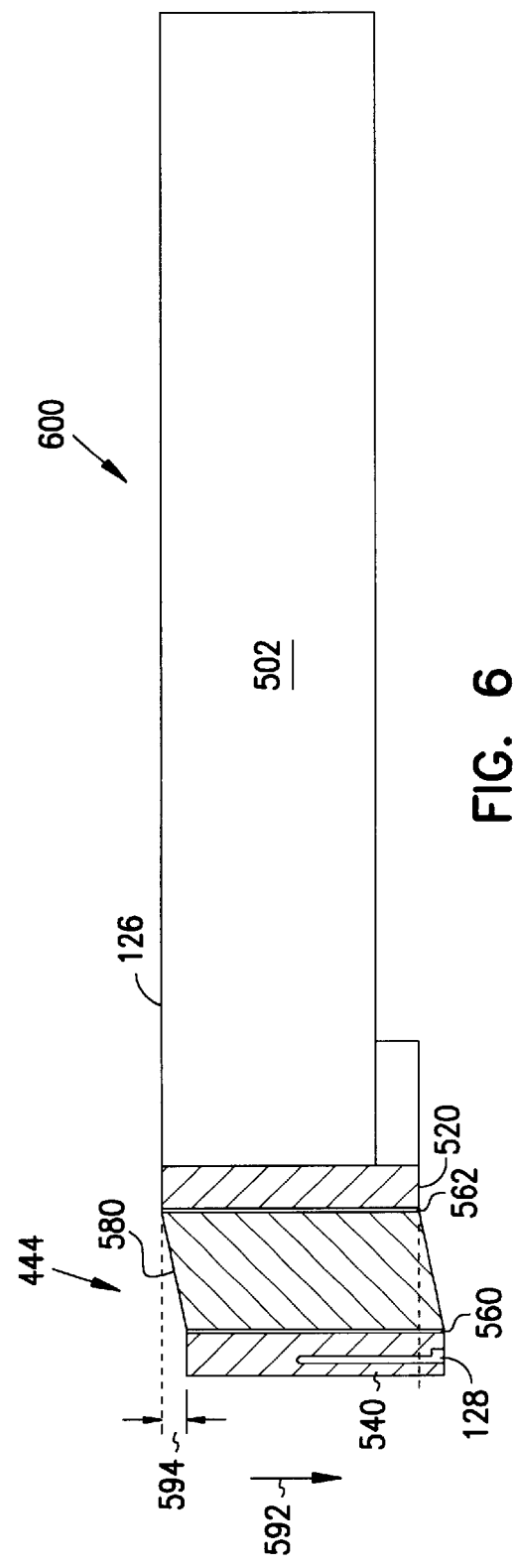

FLY HEIGHT CONTROL FOR A READ/WRITE HEAD OVER PATTERNED MEDIA

RELATED APPLICATION

This application claims the benefit of U.S. Provisional Application Ser. No. 60/168,855 filed Dec. 2, 1999 under 35 USC 119(e).

FIELD OF THE INVENTION

The present invention relates to the field of disc drive data storage devices. More particularly, this invention relates to fly height control for a read/write head over patterned media.

BACKGROUND OF THE INVENTION

An important device in any computer system is a data storage device. Computer systems have many different places where data can be stored. One place for storing massive amounts of data and instructions is a disc drive. The disc drive has one or more discs, each with two surfaces on which data is stored. The surfaces are coated with a ferromagnetic medium with regions that are magnetized in alternate directions to store the data and instructions. The coated surfaces are computer-readable media holding computer-readable data and computer-readable and computer-executable instructions. The discs are mounted on a hub of a spindle motor for rotation at an approximately constant high speed during the operation of the disc drive. An actuator assembly in the disc drive moves magnetic transducers, also called read/write heads, to various locations relative to the discs while the discs are rotating, and electrical circuitry is used to write data to and read data from the media through the read/write heads. Data and instructions are stored in the media of one or both of the surfaces of each disc. The disc drive also includes circuitry for encoding data and instructions written to the media and for decoding data and instructions read from the media. A microprocessor controls most operations of the disc drive, such as transmitting information including instructions or data read from the media back to a requesting computer and receiving data or information from the requesting computer for writing to the media.

Information representative of data or instructions is stored in tracks in the media. In some disc drives, information is stored in a multiplicity of concentric circular tracks in the media on each disc. In other disc drives, information is stored in a single track that forms a continuous spiral in the media on each disc. A read/write head is positioned over a track to write information to or read information from the track. Once the operation is complete, the read/write head may be controlled to move to a new, target track, to write information to or read information from the target track. The movement takes place in the following modes. The read/write head is moved along an arc across the media of a disc in a seek mode to position it near the target track. The read/write head is then positioned over the target track during a track-and-follow mode, also called a tracking mode, to read or write the information stored in the target track. Servo information is read from the target track by the read/write head, and a feedback control system determines a position error signal from the servo information. If the read/write head is not in a correct position, it is moved to a desired position over the target track in response to the position error signal.

Each read/write head is typically located on a slider that is supported by the actuator assembly. The actuator assembly is controlled to position the read/write head over the media of one of the discs. Each slider is attached to a load spring supported by an arm. The arms in the actuator assembly are rotatably mounted to an actuator shaft through bearings and are rotated about the actuator shaft by a voice coil motor to move the read/write heads over the media. The bearings and the actuator shaft are also called a pivot. The voice coil motor includes a voice coil mounted to the actuator assembly opposite to the arms. The voice coil is immersed in a magnetic field of an array of permanent magnets placed adjacent to the actuator assembly. The feedback control system applies current to the voice coil in a first direction to generate an electromagnetic field that interacts with the magnetic field of the magnets. The interaction of the magnetic fields applies a torque to the voice coil to rotate the actuator assembly about the pivot, and the actuator assembly is accelerated to move the read/write head to a new position. The feedback control system may then apply current to the voice coil in a direction opposite to the first direction to apply an opposite torque on the actuator assembly. The opposite torque may be used to decelerate the actuator assembly and position the read/write head over a target track. The opposite torque may also be used to accelerate the actuator assembly to a different position.

Each slider is a small ceramic block that flies over the media of one of the discs. When the disc rotates, air flow is induced between the slider and the media, causing air pressure which lifts the slider away from the media. The slider has an air bearing surface that is aerodynamically shaped to give the slider lift when air flows between the slider and the media. The load spring, described above, produces a force on the slider directed toward the media. The forces on the slider equilibrate such that the slider flies over the media at a nominal fly height. The fly height, also called clearance, is a distance between the slider and the media, and is a measure of an amount of air available to interact with the air bearing surface of the slider as it is aerodynamically supported over the media. The fly height of the slider affects the fly height of the read/write head carried by the slider, which is a distance between the media and the read/write head. The fly height of the read/write head should be approximately uniform so that the read/write head is capable of reading data from, and writing data to, the media.

Several variables affect the fly height of a slider. For example, fly height is impacted by a curvature of a disc, vibrations of the disc caused by the spindle motor, and roughness and defects in the media. Fly height is also affected by a variation in the aerodynamics of the slider due to changes in its orientation and position during flight.

The media may be patterned, and this also affects the fly height of a slider and the fly height of a read/write head. In conventional discs servo information is written as signals or bursts in servo wedges across the media. The bursts are used to determine a position of a read/write head relative to a track in the media. The bursts occupy a substantial amount of the surface of the media, and require a substantial amount of time and equipment to be written into the media. The bursts are being replaced by patterns in the media that represent servo information. The patterns are grooves and ridges formed in the servo wedges of the media of a disc. The grooves and ridges are formed during the manufacture of the disc, and occupy less area on the media than the bursts do. As a result, a greater area of the media may be used to store data or instructions.

Disc drives are being produced with increasing track densities and decreasing access times. A read/write head must fly over the media of a disc as closely as possible to read data and instructions from or write data and instructions to tracks that are closely spaced in the media. The patterns in the media abruptly change the fly height of a slider as it flies over one of the servo wedges, and therefore disturb the fly height of the read/write head in the slider. The disturbance increases the possibility of an error in reading from or writing to the media.

Several efforts have been made to improve the control the fly height of a read/write head. The load spring which forces the slider toward the media has been designed to influence fly height, and the shape of the slider has been altered in an attempt to improve its aerodynamics. However, none of the efforts have resulted in a suitable solution to the problems mentioned above. There remains a need for a system to control the fly height of a read/write head to allow it to read data from or write data to closely spaced tracks in a patterned media.

SUMMARY OF THE INVENTION

According to one embodiment of the present invention, a fly height of a read/write head in a disc drive is actively controlled as the read/write head is positioned over a rotating disc with a patterned media. The patterned media includes ridges and grooves in servo wedges in the patterned media. According to another embodiment of the present invention, an estimated fly height of the read/write head is compared with a desired fly height to generate a control signal. The control signal is used to apply a voltage difference across a piezoelectric layer joining the read/write head to a slider to move the read/write head relative to the slider and adjust the fly height of the read/write head. According to another embodiment of the present invention, a map of ridges and grooves in the patterned media is generated and the fly height of the read/write head is actively controlled based on information in the map.

Advantageously, the embodiments of the present invention provide for an active control of the fly height of a read/write head over patterned media to allow it to read data from or write data to closely spaced tracks. The active fly height control provides improved response to abrupt changes in the air flow boundary condition of an air bearing surface of a slider carrying the read/write head by moving the read/write head relative to the slider. The read/write head has a low mass relative to the slider and therefore a high resonant frequency which allows for a quick compensation of its fly height in response to the patterned media. The fly capability of the slider is maintained by allowing its fly height to change while moving the read/write head relative to the slider to maintain its capability to generate a useful read/write signal. The embodiments of the present invention help to preserve the sensitivity of the read/write head, and substantially reduces unwanted contact between the read/write head and the patterned media.

BRIEF DESCRIPTION OF THE DRAWINGS

FIG. 5 is a cross-sectional view of a slider according to an embodiment of the present invention.

FIG. 6 is a cross-sectional view of a slider according to an embodiment of the present invention.

DESCRIPTION OF THE PREFERRED EMBODIMENT

Figure 1:
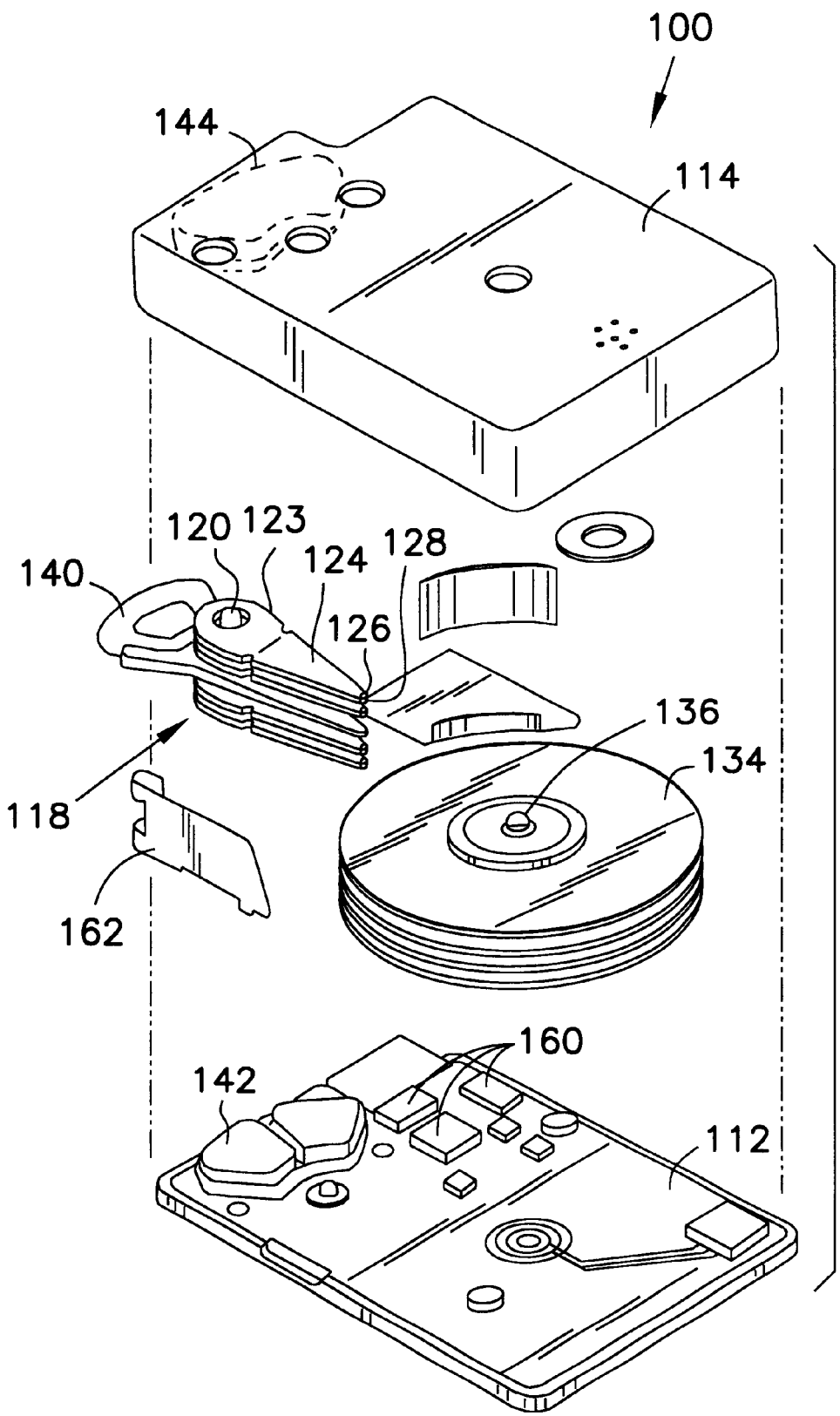
FIG. 1 is an exploded view of a disc drive according to an embodiment of the present invention.

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims. In the following description, similar elements retain the same reference numerals for purposes of clarity.

The embodiments of the present invention described in this application are useful with all types of disc drives, including hard disc drives, zip drives, media storage drives, tape drives, and floppy disc drives. An exploded view of a disc drive 100 is shown in FIG. 1 according to an embodiment of the present invention. The disc drive 100 includes a housing or base 112 and a cover 114. The base 112 and over 114 form a disc enclosure. An actuator assembly 118 is rotatably mounted to an actuator shaft 120, and the actuator shaft 120 is mounted to the base 112. The actuator assembly 118 includes a comb-like structure of a plurality of arms 123. A load spring 124 is attached to each arm 123. The load springs 124 are also referred to as suspensions, flexures, or load beams. A slider 126 is attached to an end of each load spring 124, and each slider 126 carries a read/write head 128. Each slider 126 is a small ceramic block which is passed over one of several discs 134.

The discs 134 each have two surfaces, and information is stored on one or both of the surfaces. The surfaces are coated with a magnetizable medium that is magnetized in alternate directions to store the information. The surfaces are computer-readable media holding the information including computer-readable data and computer-readable and computer-executable instructions. The information is arranged in tracks in the media of the discs 134. The discs 134 are mounted on a hub 136 of a spindle motor (not shown) for rotation at an approximately constant high speed. Each slider 126 is moved over the media of one of the discs 134 by the actuator assembly 118 as the discs 134 rotate so that the read/write head 128 may read information from or write information to the surface of the disc 134. The embodiments of the present invention described herein are equally applicable to disc drives which have a plurality of discs or a single disc attached to a spindle motor, and to disc drives with spindle motors which are either under a hub or within the hub. The embodiments of the present invention are equally applicable to disc drives in which information is stored in a multiplicity of concentric circular tracks in the media of each disc, or in disc drives in which information is stored in a single track arranged as a continuous spiral in the media of each disc.

Each slider 126 is held over the media of one of the discs 134 by opposing forces from the load spring 124 forcing the slider 126 toward the media and air pressure on an air bearing surface of the slider 126 caused by the rotation of the discs 134 lifting the slider 126 away from the media. It should also be noted that the embodiments of the present invention described herein are equally applicable to sliders 126 having more than one read/write head 128. For example, magneto-resistive heads, also called MR heads, have one head used for reading data from media and a second head for writing data to the media. MR heads may have an additional heads used for other purposes such as erasing the media.

A voice coil 140 is mounted to the actuator assembly 118 opposite the load springs 124 and the sliders 126. The voice coil 140 is immersed in a magnetic field of a first permanent magnet 142 attached within the base 112, and a second permanent magnet 144 attached to the cover 114. The permanent magnets 142, 144, and the voice coil 140 are components of a voice coil motor which is controlled to apply a torque to the actuator assembly 118 to rotate it about the actuator shaft 120. Current is applied to the voice coil 140 in a first direction to generate an electromagnetic field that interacts with the magnetic field of the permanent magnets 142, 144. The interaction of the magnetic fields applies a torque to the voice coil 140 to rotate the actuator assembly 118 about the actuator shaft 120, and the actuator assembly 118 is accelerated to move the read/write head 128 to a new position. A current applied to the voice coil 140 in a direction opposite to the first direction results in an opposite torque on the actuator assembly 118. The opposite torque may be used to decelerate the actuator assembly 118 and position the read/write head 128 over a target track on one of the discs 134. The opposite torque may also be used to accelerate the actuator assembly 118 to a different position.

The disc drive 100 includes one or more integrated circuits 160 coupled to the actuator assembly 118 through a flexible cable 162. The integrated circuits 160 may be coupled to control current in the voice coil 140 and resulting movements of the actuator assembly 118. The integrated circuits 160 may also be coupled to the read/write head 128 in the slider 126 for providing a signal to the read/write head 128 when information is being written to the media on the discs 134 and for receiving and processing a read/write signal generated by the read/write head 128 when information is being read from the media on the discs 134. A feedback control system in the integrated circuits 160 may receive servo information read from the media through the read/write heads 128. The feedback control system determines a position error signal from the servo information. If the read/write heads 128 are not in a correct position, they are moved to a desired position over a target track in response to the position error signal. The circuits 160 may include a microprocessor, a digital signal processor, or one or more state machines to control operations of the disc drive 100. The integrated circuits 160 may also include memory devices such as EEPROM and DRAM devices and modulation and amplification circuits.

Figure 2:
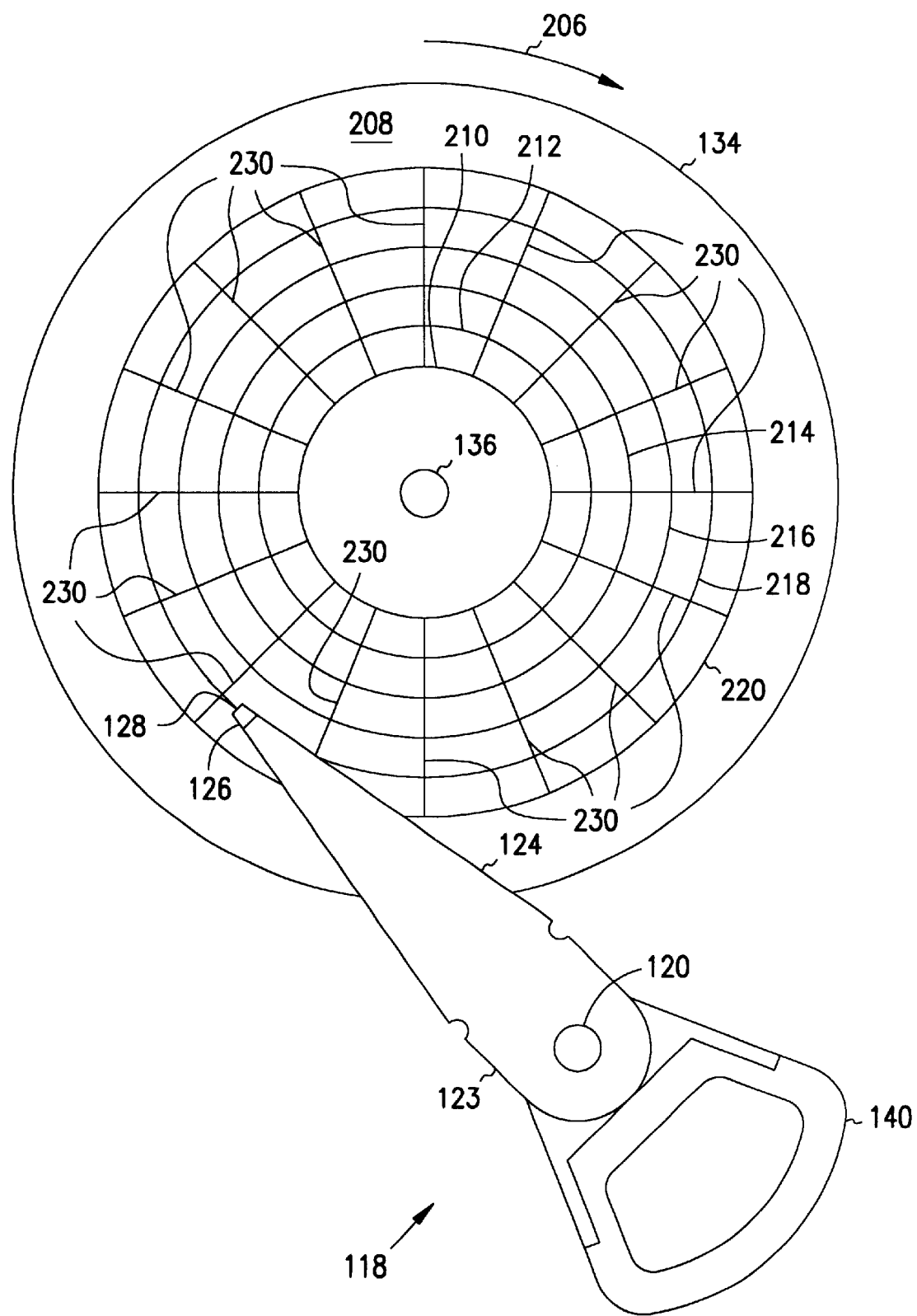
FIG. 2 is a top view of a disc and an actuator assembly according to an embodiment of the present invention.

A top view of one of the discs 134 and the actuator assembly 118 of FIG. 1 is shown in FIG. 2 according to an embodiment of the present invention. The disc 134 rotates in a direction 206 and has a top surface that is coated with a magnetizable medium to form a computer-readable media 208. Thousands of concentric circular tracks are arranged in the media 208, and information is stored in each track. Six of the tracks, including an inner track 210, four intermediate tracks 212, 214, 216, and 218, and an outer track 220, are shown spaced apart on the media 208. The read/write head 128 may be moved from the outer track 220 to the inner track 210 with a rotation of the actuator assembly 118 about the actuator shaft 120 by providing current to the voice coil 140 in a first direction. The read/write head 128 may be moved from the inner track 210 to the outer track 220 with a rotation of the actuator assembly 118 by providing current to the voice coil 140 in a second direction opposite to the first direction.

The tracks are divided into sectors. The tracks are also divided by a number of servo wedges 230, sixteen of which are shown spaced apart in the media 208. The servo wedges 230 are narrow radial curved wedges embedded in the media 208 that are patterned to store servo information including track numbers, sector numbers, and tracking information to be read by the read/write head 128. The track numbers and sector numbers identify the track and sector over which the read/write head 128 is positioned, and the tracking information is used by a feedback control system in the integrated circuits 160 to control the position of the read/write head 128. The servo wedges 230 may or may not occur at boundaries between the sectors. There may be more or less than sixteen servo wedges 230 in the media 208.

Figure 3:
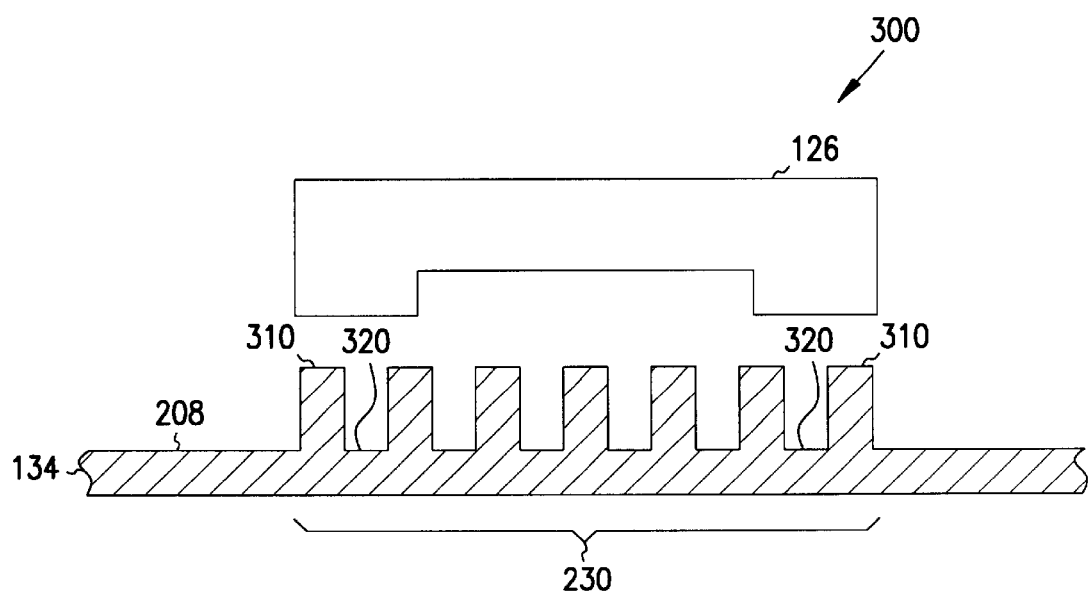
FIG. 3 is a cross-sectional view of a disc according to an embodiment of the present invention.

A cross-sectional view 300 of the disc 134 and the media 208 is shown in FIG. 3 according to an embodiment of the present invention. The slider 126 is also shown passing over one of the servo wedges 230. The servo wedge 230 is patterned with alternating ridges 310 and grooves 320 that are a discontinuous change of the topography of the media 208. The magnetic properties of the pattern change with the height of the ridges 310. More specifically, a magnetic property of a top of a ridge 310 is different than the magnetic property at the bottom of a groove 320. The read/write head 128 (not shown) in the slider 126 can therefore read the pattern of ridges 310 and grooves 320 as it flies over the servo wedge 230. The height of the ridges 310, which is also the depth of the grooves 320, and a ratio of a width of the ridges 310 to a width of the grooves 320, are selected to present a magnetic pattern to the read/write head 128. The lengths of the different ridges 310 in the pattern may also be staggered such that there are gaps in the ridges 310 of the pattern. The pattern represents servo information including track numbers, sector numbers, and tracking information.

The fly height of the slider 126 is measured from the media 208, and changes abruptly over the servo wedges 230 where they are measured from the tops of the ridges 310. The air between the tops of the ridges 310 and the slider 126 is available to interact with the air bearing surface. However, air between the ridges 310 and in the grooves 320 is not available for the air bearing surface, and therefore there is a loss of fly height of the slider 126 approximately equal to the height of the ridges 310. The pattern abruptly changes the air flow boundary condition of the air bearing surface of the slider 126, and causes a discontinuous fly height variation for the slider 126 which can cause unwanted contact between the read/write head 128 carried by the slider 126 and the media 208. Also, the read/write head 128 may suffer a loss of sensitivity without precise control of its fly height over the media 208.

Figure 4:
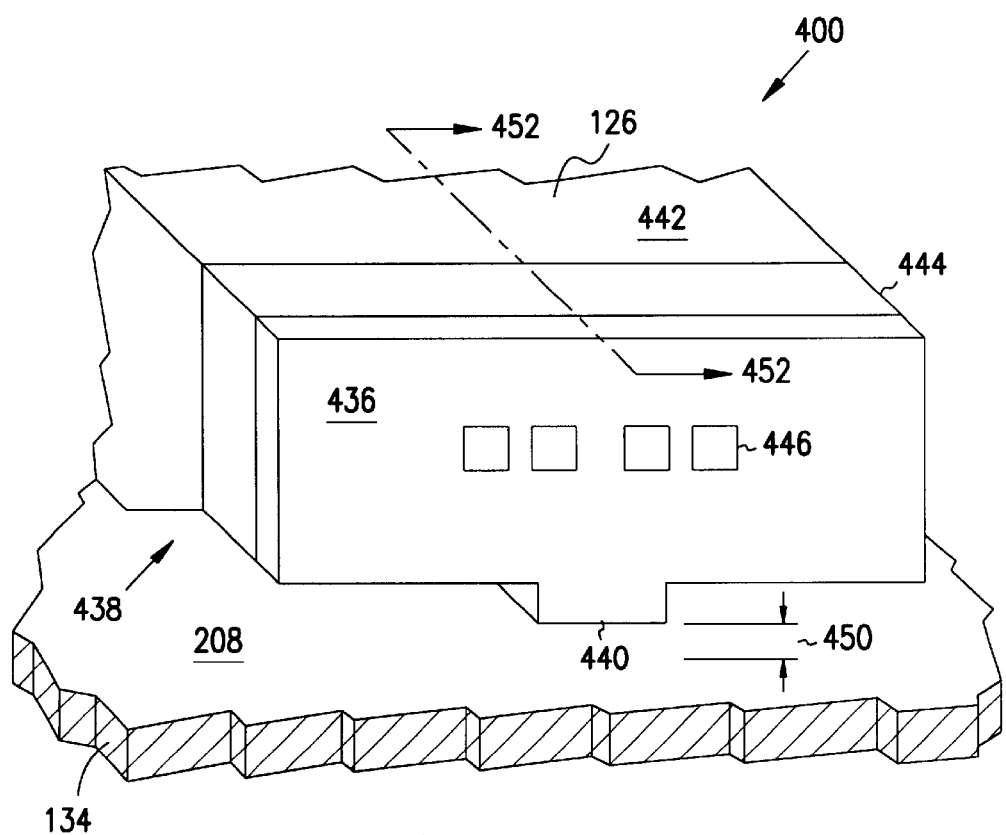
FIG. 4 is a perspective view of a slider and a disc according to an embodiment of the present invention.

A perspective view 400 of the slider 126 and the disc 134 shown in FIGS. 1, 2, and 3 is shown in FIG. 4 according to an embodiment of the present invention. The slider 126 has a trailing edge surface 436 and is positioned above the media 208. The slider 126 includes an air bearing surface 438, a center pad 440, a top surface 442, a shear transducer 444, and a number of bond pads 446. The air bearing surface 438 is aerodynamically designed so that air flow caused by a rotation of the disc 134 lifts the slider 126 such that it flies at a fly height 450 above the media 208. The read/write head 128 (not shown) is carried in the shear transducer 444. The bond pads 446 on the trailing edge surface 436 provide an area for electronic leads to be attached to the slider 126 to allow electronic signals to pass from and to the read/write head 128.

The shear transducer 444 allows the read/write head 128, located near the trailing edge surface 436, to be adjusted so that it more closely follows the patterned media 208. A voltage difference is applied across the shear transducer 444 via several conductive surfaces to cause it to shear and cause the trailing edge surface 436 and the read/write head 128 to move relative to other portions of the slider 126. Thus, the read/write head 128 can be moved closer to or further away from the media 208 based on the voltage difference applied across the shear transducer 444.

A cross-sectional view 500 of the slider 126 taken along a line 452–452 in FIG. 4 is shown in FIG. 5 according to an embodiment of the present invention. The shear transducer 444 attached to a body 502. The shear transducer 444 comprises a first insulator layer 520, a second insulator layer 540, first and second conductive metallic layers 560, 562, and a piezoelectric layer 580. Located in the second insulator layer 540 is the read/write head 128. The piezoelectric layer 580 is polarized such that when a voltage difference is applied across it between the conductive metallic layers 560, 562, the piezoelectric layer 580 shears, or distorts in shape. As the piezoelectric layer 580 shears, the read/write head 128 is moved in the direction of the shear. A polarity of the voltage difference across the conductive metallic layers 560, 562 determines a direction of the shear of the piezoelectric layer 580. A voltage difference of a first polarity will move the read/write head 128 closer to the media 208 shown in FIG. 4, and a voltage difference of a second polarity opposite to the first will move the read/write head 128 farther away from the media 208. The shear transducer 444 is controlled to maintain a desired fly height of the read/write head 128 such that it may read information from and write information to the media 208 without substantial errors. The fly height of the read/write head 128 must be adjusted as the slider 126 flies over the patterned media 208 represented by the servo wedge 230 shown in FIG. 3.

The body 502 of the slider 126 is formed of silicon or other suitable material, such as aluminum titanium carbonate, silicon, or silicon carbonate. The first and second insulator layers 520, 540 are formed of alumina and insulate portions of the slider 126 from the voltage applied to the conductive metallic layers 560, 562. The first insulator layer 520 prevents charge from reaching the body 502. The second insulator layer 540 prevents charge from interfering with the operation of the read/write head 128. The first and second insulator layers 520, 540 also prevent a voltage discharge between the air bearing surface 438 and the disc 134, shown in FIG. 4, which may damage the disc 134.

The first and second insulator layers 520, 540 also provide a surface to which the conductive metallic layers 560, 562 can be bonded. Each of the conductive metallic layers 560, 562 is a thin layer of metal deposited on the alumina of one of the first and second insulator layers 520, 540, and is attached to the piezoelectric layer 580 with a conductive epoxy. The conductive metallic layers 560, 562 comprise gold, platinum, or nickel, or a combination thereof. The piezoelectric layer 580 comprises lead zirconate titanate, barium zirconate titanate, or ceramics or polymers which exhibit piezoelectric properties, or a combination thereof.

A cross-sectional view 600 of the slider 126 taken along the line 452–452 in FIG. 4 is shown in FIG. 6 according to an embodiment of the present invention. The view 600 shows the shear transducer 444 in a sheared position. The slider 126 is shown after a voltage difference with a first polarity has been applied across the piezoelectric layer 580 between the conductive metallic layers 560, 562. The piezoelectric layer 580 has sheared and the second insulator layer 540 has moved downward in the direction of arrow 592. The read/write head 128, which is carried in the second insulator layer 540, is likewise moved in the direction of the arrow 592 toward the media 208 shown in FIG. 4. The change in position of the shear transducer 444 is denoted by the dimension 594. If a voltage difference of a second polarity opposite to the first were applied across the piezoelectric layer 580, the read/write head 128 would be moved in a direction opposite to the arrow 592, and away from the media 208. The fly height of the read/write head 128 can thereby be modified and fine tuned as the slider 126 passes over one of the servo wedges 230 of the media 208 shown in FIGS. 2 and 3.

Figure 7:
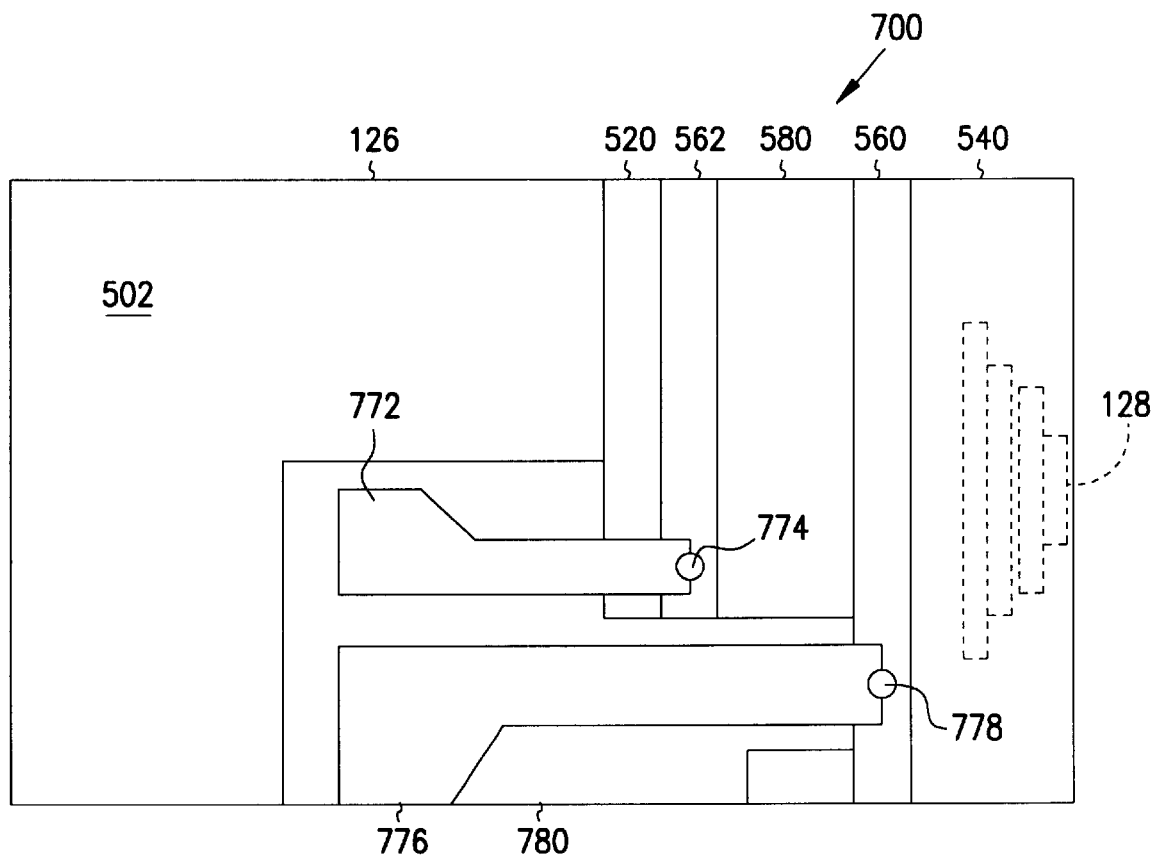
FIG. 7 is a top view of a slider according to an embodiment of the present invention.

A top view 700 of the slider 126 is shown in FIG. 7 according to an embodiment of the present invention. The top view 700 illustrates how a voltage difference may be applied across the piezoelectric layer 580. Visible on the slider 126 is the body 502, the first and second insulator layers 520, 540, the conductive metallic layers 560, 562, and the piezoelectric layer 580. An outline of the read/write head 128 is also shown. A first conductor 772 is connected to the second conductive metallic layer 562 at a bond point 774, and a second conductor 776 is connected to the first conductive metallic layer 560 at a bond point 778. The first and second conductors 772, 776 are insulated from other parts of the slider 126 by an insulating pad 780. The first and second conductors 772, 776 are flexible enough to function throughout the displacement that occurs when the piezoelectric layer 580 shears, and are large enough to form a connection with electrical circuitry that controls the voltage difference applied between them.

Figure 8:
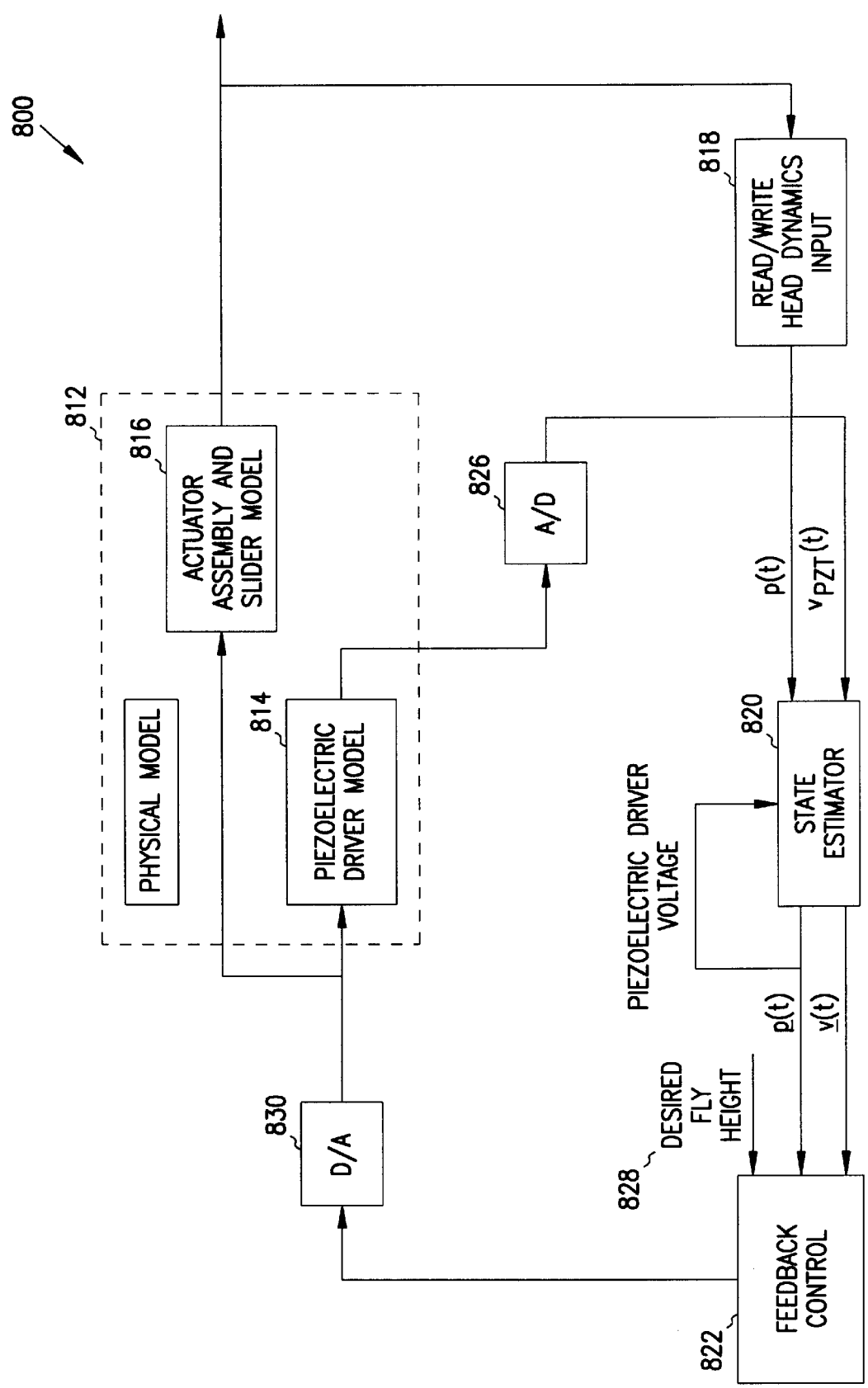
FIG. 8 is a block diagram of a control system to actively control a fly height of a read/write head according to an embodiment of the present invention.

A block diagram of a control system 800 used to actively control the fly height of the read/write head 128 is shown in FIG. 8 according to an embodiment of the present invention. The control system 800 is a closed loop control system which adjusts a position of the shear transducer 444 based on a sensed position of the read/write head 128. The control system 800 provides active fly height control for the read/write head 128 over patterned media such as the servo wedge 230 in the media 208 shown in FIG. 3. The fly height of the read/write head 128 is controlled substantially independent of the fly height of the slider 126.

The control system 800 includes a physical model 812 that comprises a piezoelectric driver model 814. The piezoelectric driver model 814 is a mathematical model representing a movement of the read/write head 128 as the piezoelectric layer 580 shears in response to the voltage difference across the conductive metallic layers 560, 562 in the shear transducer 444. The control system 800 also includes a model 816 of the actuator assembly 118 and the slider 126. The model 816 is a mathematical representation of the motion of the slider 126 that includes elements representing vibration in the actuator assembly 118, particularly vibration in the load springs 124. The model 816 includes the effect of changes in the shear transducer 444 on the motion of the slider 126.

The control system 800 also includes read/write head dynamics input 818, a state estimator 820, and a feedback controller 822. The state estimator 820 works in conjunction with the read/write head dynamics input 818 to estimate the fly height of the read/write head 128 based on a magnetoresistive thermo-cooling effect. The magnetoresistive thermo-cooling effect is a phenomenon whereby a temperature of the read/write head 128 varies almost linearly with its fly height. More specifically, a rate of cooling of the read/write head 128 changes with its fly height, and along with the temperature change comes a change in the resistive properties of the read/write head 128. These resistive changes can be detected by evaluating a bias voltage across the read/write head 128. Accordingly, the fly height of the read/write head 128 is estimated from the read/write signal that it generates. Other methods may be used to estimate the fly height of the read/write head 128. For example, a capacitance plate on the slider 126 can detect changes in the fly height of the slider 126 via a tuned circuit. A tunneling electron probe tip may be placed near the read/write head 128 to measure a tunnel current from the probe tip to the disc 134 when a bias voltage is applied across the probe tip.

The estimated fly height is input from the read/write head dynamics input 818, and is then used by the state estimator 820 to predict the fly height of the read/write head 128. The state estimator 820 receives as an input a sampled position p(t) and a sampled voltage $v_{PZT}(t)$, and determines an estimated voltage $v_{PZT}(t)$ and an estimated position p(t). The state estimator 820 also compensates for error or noise. The feedback control 822 uses the estimated position p(t) and estimated voltage $v_{PZT}(t)$ to create a formula for refining the positioning of the read/write head 128. A desired fly height 828 is programmed into the control system 800, and the estimated position p(t) and the estimated voltage $v_{PZT}(t)$ are compared to the desired fly height 828 as part of the feedback control 822. A command voltage signal is sent to a digital to analog (D/A) converter 830 to control the voltage difference across the conductive metallic layers 560, 562 in the shear transducer 444.

The control system 800 can be based on numerous control strategies including, but not limited to, a linear quadratic regulator, $H_{oo}$, $H_2$, proportional-integral-derivative (PID), feed forward, and adaptive approaches that allow the control system 800 to 'learn' the variations of the disc drive 100.

The read/write head 128 has a low mass relative to the slider 126, and therefore a high resonant frequency, on the order of 7.6 MHz, which allows for a quick compensation of its fly height in response to the patterns in the media 208.

Figure 9:
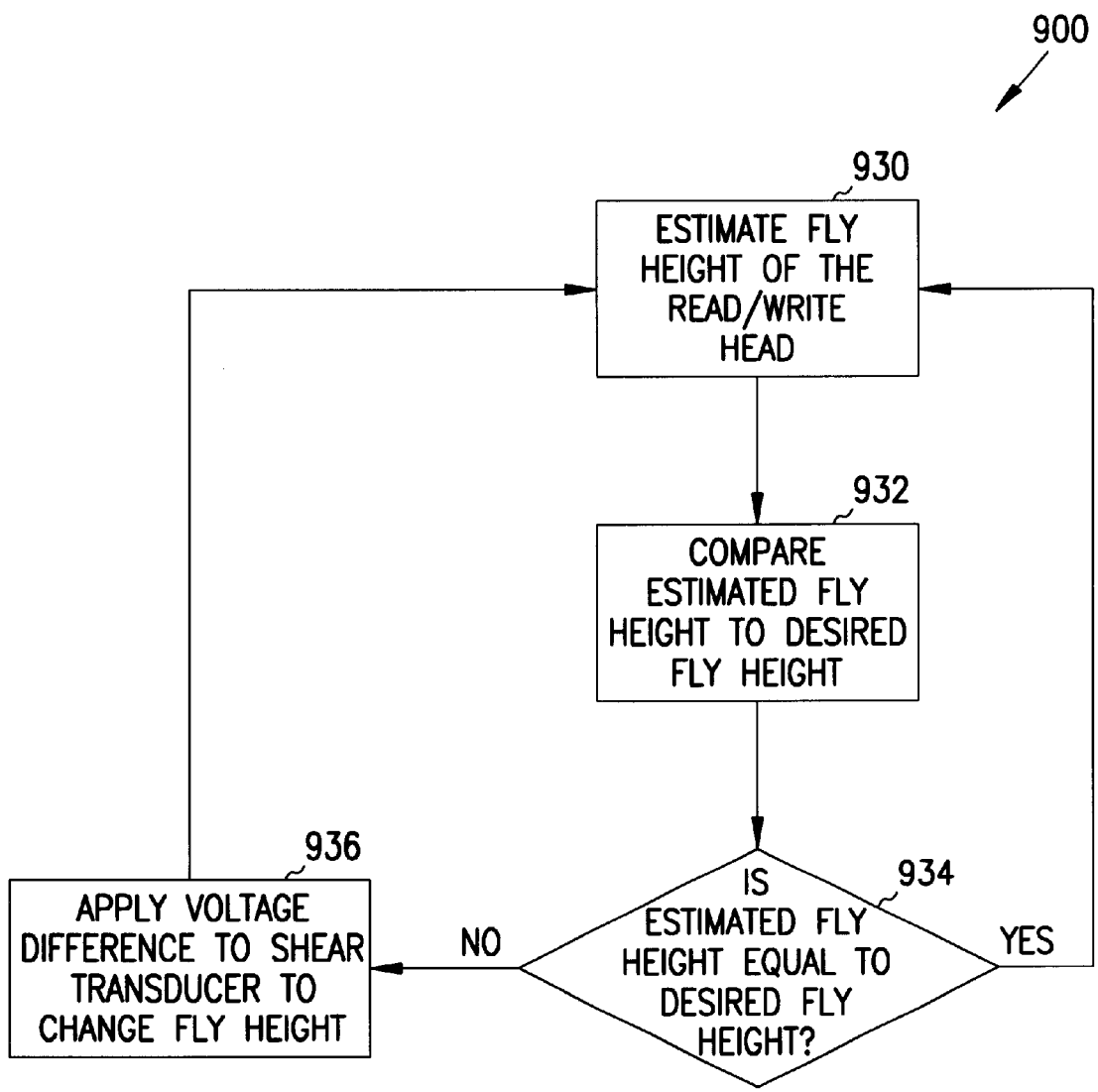
FIG. 9 is a flow chart of a method for actively controlling a fly height of a read/write head according to an embodiment of the present invention.

A flowchart of a more general method 900 for actively controlling the fly height of the read/write head 128 is shown in FIG. 9 according to an embodiment of the present invention. In 930, the fly height of the read/write head 128 is estimated according to one of the methods described above. In 932, the estimated fly height is compared to a desired fly height. Based on the comparison, the method 900 determines in 934 whether the estimated fly height of the read/write head 128 is equal to the desired fly height. If so, the method 900 returns to 930. If the estimated fly height is not equal to the desired fly height, a voltage difference is applied to the shear transducer 444 to change the fly height of the read/write head 128 in 936 before returning to 930. The method 900 is repeated during the operation of the disc drive 100 to ensure a proper fly height of the read/write head 128.

Figure 10:
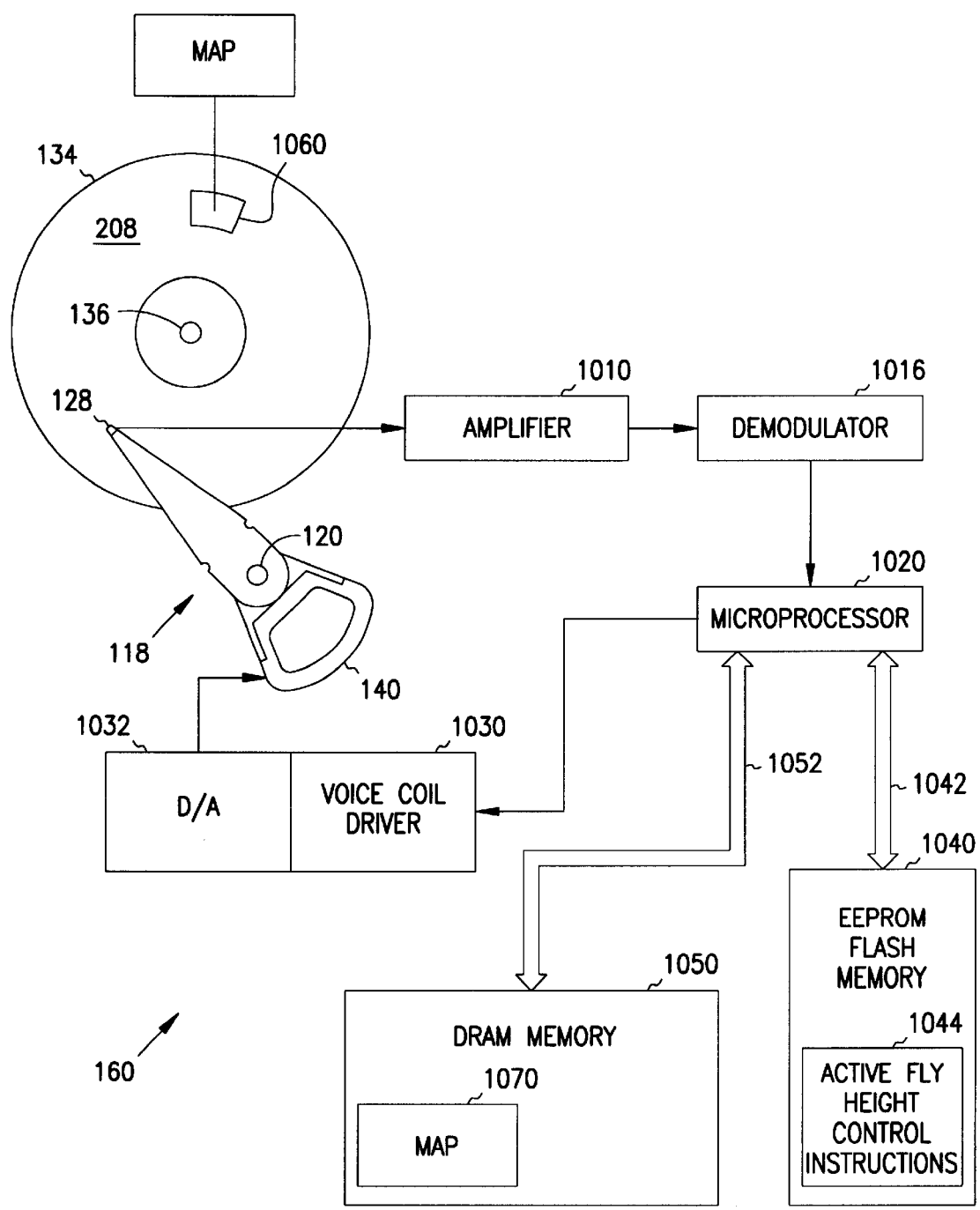
FIG. 10 is a block diagram of a disc drive according to an embodiment of the present invention.

A block diagram of the actuator assembly 118, the discs 134, and the circuits 160 of the disc drive 100 is shown in FIG. 10 according to an embodiment of the present invention. The media 208 shown in FIGS. 2 and 3 is also shown in FIG. 10 without the tracks 210–220 or the servo wedges 230 for purposes of clarity. The position of one of the read/write heads 128 over the media 208 is controlled by a feedback control system in the circuits 160. Those skilled in the art with the benefit of the present description will understand that the circuits 160 control the position of all the read/write heads 128 relative to all of the discs 134, either one at a time or simultaneously.

The feedback control system includes an amplifier 1010 to amplify the read/write signal generated by the read/write head 128 as it is reading information from the media 208. The read/write signal amplified by the amplifier 1010 is demodulated by a demodulator 1016 and provided to a microprocessor 1020 that controls most operations of the disc drive 100. The microprocessor 1020 generates a control signal to control a movement of the actuator assembly 118. The control signal is coupled to a voice coil driver 1030 which generates a driver signal that is converted by a digital-to-analog (D/A) converter circuit 1032 into an analog driver signal that is applied to the voice coil 140. The microprocessor 1020 estimates a fly height of the read/write head 128 based in part on the read/write signal which indicates the magnetoresistive thermo-cooling effect described above. Other feedback sensor methods known to those skilled in the art could be applied as well.

The microprocessor 1020 processes a servo interrupt each time the read/write head 128 passes over one of the servo wedges 230 in the media 208. The read/write head 128 reads the servo information in the servo wedge 230 and transmits it to the microprocessor 1020. The tracking information in the servo wedge 230 indicates the position of the read/write head 128 relative to one of the tracks by track number and sector number, and the microprocessor 1020 generates a position error signal from the tracking information indicating an error in the position of the read/write head 128 relative to the track. The position error signal is used to correct the position of the read/write head 128 in the track-and-follow mode, and the control signal is generated based in part on the position error signal.

The microprocessor 1020 is also coupled through the flexible cable 162 to the first and second conductors 772, 776 in the slider 126 to provide a control signal to cause the piezoelectric layer 580 to shear and control the fly height of the read/write head 128.

The microprocessor 1020 is coupled to exchange information with an EEPROM flash memory device 1040 through a bus 1042. The flash memory device 1040 is a computer-readable medium that stores computer-readable and computer-executable instructions or data. The computer-readable and computer-executable instructions include active fly height control instructions 1044 in the form of assembly code to implement the control system 800 shown in FIG. 8, or the method 900 shown in FIG. 9. The microprocessor 1020 retrieves and executes the instructions 1044 to control the fly height of the read/write head 128 according to embodiments of the present invention. The microprocessor 1020 is also coupled to exchange information with a DRAM memory device 1050 through a bus 1052. The DRAM memory device 1050 is a computer-readable medium that comprises computer-readable and computer-executable instructions or data.

The fly height of the read/write head 128 may also be controlled with the aid of a map of the media 208 having detailed information of the patterns in the media 208, specifically the heights of the ridges 310 and the depths of the grooves 320 of the servo wedges 230 as well as defects in the media 208. The map is stored in the media 208 as a map 1060, and is loaded into the DRAM memory device 1050 as a map 1070 when the disc drive 100 is operating. Information in the map 1070 is retrieved by the microprocessor 1020 to estimate the loss or gain of the fly height of the slider 126 across the media 208. This information is used by the microprocessor 1020 to adjust the fly height of the read/write head 128 as the slider 126 travels over the media 208. The map 1070 may include control information to modify the control system 800 shown in FIG. 8 in ways known to those skilled in the art. The map 1060 may be updated during the operating life of the disc drive 100 to accommodate for changes in the media 208.

The embodiments of the present invention described above provide for an active control of the fly height of a read/write head over patterned media to allow it to read data from or write data to closely spaced tracks. The active fly height control provides improved response to abrupt changes in the air flow boundary condition of the air bearing surface of a slider carrying the read/write head by moving the read/write head relative to the slider. The read/write head has a low mass relative to the slider and therefore a high resonant frequency which allows for a quick compensation of its fly height in response to the patterned media. The fly capability of the slider is maintained by allowing its fly height to change while moving the read/write head relative to the slider to maintain its capability to generate a useful read/write signal. The embodiments of the present invention help to preserve the sensitivity of the read/write head, and substantially reduces unwanted contact between the read/write head and the patterned media.

Figure 11:
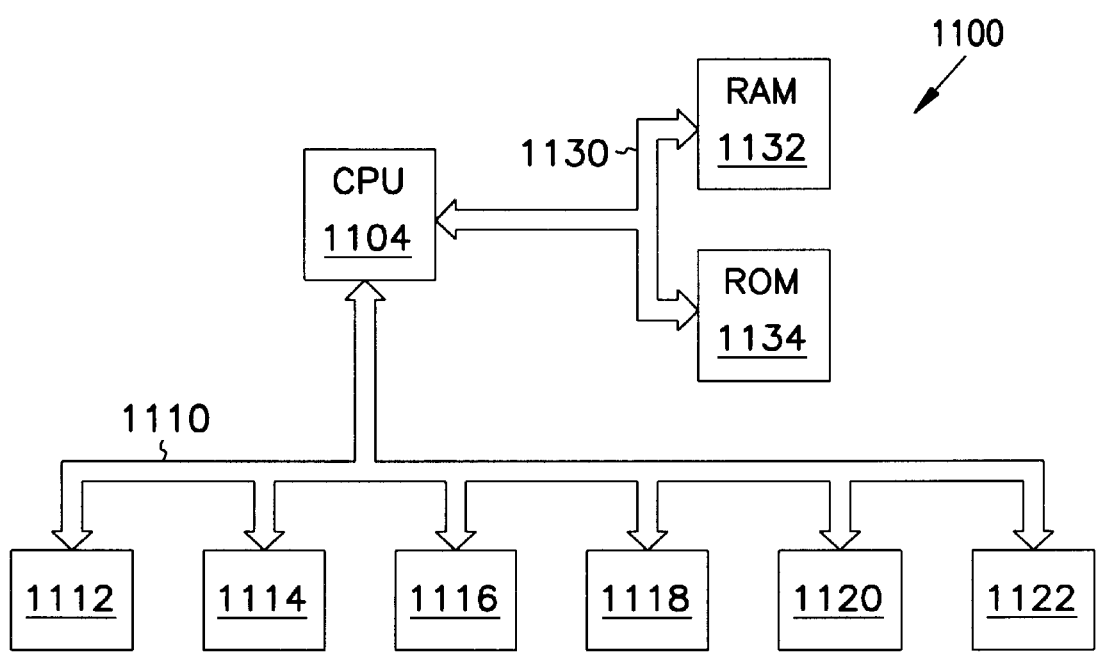
FIG. 11 is a block diagram of an information handling system according to an embodiment of the present invention.

A block diagram of an information handling system 1100 is shown in FIG. 11 according to an embodiment of the present invention. The information handling system 1100 may also be called an electronic system or a computer system. The information handling system 1100 includes a central processing unit (CPU) 1104 coupled to exchange information through a bus 1110 with several peripheral devices 1112, 1114, 1116, 1118, 1120, and 1122. The peripheral devices 1112–1122 include the disc drive 100 according to embodiments of the present invention, and may also include a magneto optical drive, a floppy disc drive, a monitor, a keyboard, and other such peripherals. The CPU 1104 is also coupled to exchange information through a bus 1130 with a random access memory (RAM) 1132 and a read-only memory (ROM) 1134.

Those skilled in the art having the benefit of this description can appreciate that the present invention may be practiced with any variety of system. Such systems may include, for example, a video game, a hand-held calculator, a personal computer, a server, a workstation, a routing switch, or a multi-processor computer system, or an information appliance such as, for example, a cellular telephone or any wireless device, a pager, or a daily planner or organizer, or an information component such as, for example, a telecommunications modem, or other appliance such as, for example, a hearing aid, washing machine or microwave oven.

CONCLUSION

In conclusion, a disc drive system 100 is disclosed. The disc drive system 100 includes a disc 134 coupled to rotate, a patterned media 208 on the disc 134, a read/write head 128 positioned over the disc 134 and separated from the patterned media 208 by a clearance or fly height, and a control circuit 160 configured to actively control the clearance or fly height between the read/write head 128 and the patterned media 208 as the disc 134 rotates. The disc drive system 100 may include a slider 126 aerodynamically supported over the disc 134, the read/write head 128 being coupled to the slider 126 by a shear transducer 444 that shears in response to an applied voltage difference to change the position of the read/write head 128 relative to the slider 126. The shear transducer 444 of the disc drive system 100 may include a piezoelectric layer 580, a first conductive layer 562 in contact with the piezoelectric layer 580 and separated from the slider 126 by a first insulating layer 520, a second insulating layer 540 holding the read/write head 128, a second conductive layer 560 in contact with the piezoelectric layer 580 and separating the piezoelectric layer 580 from the second insulating layer 540, and first and second conductors 772, 776 connected respectively to the first and second conductive layers 560, 562 coupled to receive a control signal to apply a voltage difference across the piezoelectric layer 580 to cause the piezoelectric layer 580 to shear and change the position of the read/write head 128 relative to the slider 126. The disc drive system 100 may also include a slider 126 aerodynamically supported over the disc 134, the read/write head 128 being coupled to the slider 126 by a shear transducer 444 that shears in response to an applied voltage difference to change the position of the read/write head 128 relative to the slider 126. The control circuit 160 may be configured to generate the voltage difference to modify the clearance or fly height between the read/write head 128 and the patterned media 208 as the disc 134 rotates independent of a clearance or fly height of the slider 126. The read/write head 128 may have a smaller mass than a mass of the slider 126. The disc drive system 100 may also include a map 1060, 1070 of the patterned media 208 stored on a computer-readable medium 134, 1040, 1050, the map 1060, 1070 including information of the patterned media 208 and control information. The control circuit 160 may be configured to modify the clearance or fly height between the read/write head 128 and the patterned media 208 in response to the information in the map 1060, 1070 as the disc 134 rotates. The patterned media 208 may include a number of tracks and a number of servo wedges, each servo wedge including a number of ridges 310 and a number of grooves 320 alternating with the ridges 310, each ridge 310 having a width and a height in the patterned media 208 and the ridges 310 having different lengths to leave gaps in the patterned media 208. The control circuit 160 may include a control system 800 having a physical model 812. The physical model 812 may include a piezoelectric driver model 814 representing a movement of the read/write head 128 in response to a shear of a piezoelectric layer 580, and a model 816 of an actuator assembly 118 and a slider 126 representing the dynamics of the slider 126, the slider 126 being supported over the disc 134 by the actuator assembly 118 and the read/write head 128 being coupled to the slider 126 through the piezoelectric layer 580. The control system 800 may also include a read/write head 128 dynamic model 818, a state estimator 820 to generate an estimated clearance or fly height of the read/write head 128 based on a magnetoresistive thermo-cooling effect for a sensor, and a feedback controller 822 to generate a control signal to control a shear of the piezoelectric layer 580 and a movement of the read/write head 128 based on a difference between a desired clearance or fly height of the read/write head 128 and the predicted clearance or fly height. The control circuit 160 may include a microprocessor 1020 coupled through an amplifier 1010 and a demodulator 1016 to receive a read/write signal generated by the read/write head 128 based on information on the disc 134, the microprocessor 1020 being configured to estimate the clearance or fly height of the read/write head 128 based in part on the read/write signal that indicates a magnetoresistive thermo-cooling effect in the read/write head 128. The microprocessor 1020 may be configured to generate a control signal to control a movement of the read/write head 128 through a piezoelectric layer 580 based on the estimated clearance or fly height. The control circuit 160 may also include a memory device 1040, 1050 coupled to the microprocessor 1020 to store instructions to be executed by the processor to control the clearance or fly height of the read/write head 128. An information handling system 1100 including the disc drive system 100 may also include a bus 1110 operatively coupled to the disc drive system 100, a central processing unit 1104 operatively coupled to the bus 1110, and several peripheral devices operatively coupled to the bus 1110.

A method for controlling a clearance or fly height of a read/write head 128 over a patterned media 208 in a disc drive system 100 is also disclosed. The method includes rotating a disc 134 including a patterned media 208, positioning a read/write head 128 over the patterned media 208, and actively controlling a clearance or fly height between the read/write head 128 and the patterned media 208 as the disc 134 rotates. The clearance or fly height is actively controlled by estimating the clearance or fly height, generating a control voltage based on a difference between the estimated clearance or fly height and a desired clearance or fly height, and coupling the control voltage to a shear transducer 444 coupled between the read/write head 128 and a slider 126 to cause the shear transducer 444 to shear and move the read/write head 128 relative to the slider 126. The read/write head 128 is moved by coupling a voltage difference across a piezoelectric layer 580 coupled between the read/write head 128 and a slider 126 to cause the piezoelectric layer 580 to shear and move the read/write head 128 relative to the slider 126. The method may also include positioning a slider 126 over the patterned media 208, the slider 126 being coupled to the read/write head 128 by a shear transducer 444, estimating the clearance or fly height of the read/write head 128, actively generating a control signal based on a difference between the estimated clearance or fly height and a desired clearance or fly height of the read/write head 128 over the patterned media 208, and applying the control signal to a shear transducer 444 to move the read/write head 128 relative to the slider 126. The clearance or fly height is estimated by estimating the clearance or fly height of the read/write head 128 based on a read/write signal generated by the read/write head 128 that changes due to a magnetoresistive thermo-cooling effect in the read/write head 128. The method may also include generating a map 1060, 1070 of ridges 310 and grooves 320 in the patterned media 208, storing the map 1060, 1070 in a computer-readable medium 134, 1040, 1050, retrieving information about the patterned media 208 from the map 1060, 1070 as the disc 134 is rotating, and actively controlling the clearance or fly height of the read/write head 128 based on the information in the map 1060, 1070.

Also disclosed is a disc drive system 100 including a disc 134 mounted to rotate about an axis 136, a patterned media 208 on the disc 134, a slider 126 including a read/write head 128 and being supported by an actuator assembly 118 over the patterned media 208, the read/write head 128 being separated from the patterned media 208 by a clearance or fly height, and a circuit 160 for controlling the clearance or fly height of the read/write head 128 over the patterned media 208.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc drive system comprising:

a disc coupled to rotate;

a patterned media on the disc;

a read/write head positioned over the disc and separated from the patterned media by a clearance or fly height;

a control circuit configured to actively control the clearance or fly height between the read/write head and the patterned media as the disc rotates; and a slider aerodynamically supported over the disc, the read/write head being coupled to the slider by a shear transducer that shears in response to an applied voltage difference to change the position of the read/write head relative to the slider, the shear transducer including a piezoelectric layer and a plurality of conductive and insulating layers.

2. The disc drive system of claim 1 wherein the shear transducer comprises:

a first conductive layer in contact with the piezoelectric layer and separated from the slider by a first insulating layer;

a second insulating layer holding the read/write head;

a second conductive layer in contact with the piezoelectric layer and separating the piezoelectric layer from the second insulating layer; and first and second conductors connected respectively to the first and second conductive layers coupled to receive a control signal to apply a voltage difference across the piezoelectric layer to cause the piezoelectric layer to shear and change the position of the read/write head relative to the slider.

3. The disc drive system of claim 1, further comprising:

a slider aerodynamically supported over the disc, the read/write head being coupled to the slider by a shear transducer that shears in response to an applied voltage difference to change the position of the read/write head relative to the slider; and wherein the control circuit is configured to generate the voltage difference to modify the clearance or fly height between the read/write head and the patterned media as the disc rotates independent of a clearance or fly height of the slider.

4. The disc drive system of claim 3 wherein the read/write head has a smaller mass than a mass of the slider.

5. The disc drive system of claim 1, further comprising:

a map of the patterned media stored on a computer-readable medium, the map comprising information of the patterned media and control information; and wherein the control circuit is configured to modify the clearance or fly height between the read/write head and the patterned media in response to the information in the map as the disc rotates.

6. The disc drive system of claim 1 wherein the patterned media comprise:
   a plurality of tracks; and
   a plurality of servo wedges, each servo wedge comprising a plurality of ridges and a plurality of grooves alternating with the ridges, each ridge having a width and a height in the patterned media and the ridges having different lengths to leave gaps in the patterned media.

7. The disc drive system of claim 1 wherein the control circuit comprises a control system comprising:
   a physical model comprising:
      a piezoelectric driver model representing a movement of the read/write head in response to a shear of a piezoelectric layer; and
      a model of an actuator assembly and a slider representing the dynamics of the slider, the slider being supported over the disc by the actuator assembly and the read/write head being coupled to the slider through the piezoelectric layer;
   a read/write head dynamic model;
   a state estimator to generate an estimated clearance or fly height of the read/write head based on a magnetoresistive thermo-cooling effect for a sensor; and
   a feedback controller to generate a control signal to control a shear of the piezoelectric layer and a movement of the read/write head based on a difference between a desired clearance or fly height of the read/write head and the predicted clearance or fly height.

8. The disc drive system of claim 1 wherein the control circuit comprises:
   a microprocessor coupled through an amplifier and a demodulator to receive a read/write signal generated by the read/write head based on information on the disc, the microprocessor being configured to estimate the clearance or fly height of the read/write head based in part on the read/write signal that indicates a magnetoresistive thermo-cooling effect in the read/write head, and the microprocessor being configured to generate a control signal to control a movement of the read/write head through a piezoelectric layer based on the estimated clearance or fly height; and
   a memory device coupled to the microprocessor to store instructions to be executed by the processor to control the clearance or fly height of the read/write head.

9. An information handling system of the type including the disc drive system of claim 1, and further comprising:
   a bus operatively coupled to the disc drive system;
   a central processing unit operatively coupled to the bus; and
   peripheral devices operatively coupled to the bus.

10. A method for controlling a clearance or fly height of a read/write head over a patterned media in a disc drive system, the method comprising steps of:
    (a) rotating a disc comprising a patterned media;
    (b) positioning a read/write head over the patterned media; and
    (c) actively controlling a clearance or fly height between the read/write head and the patterned media as the disc rotates by estimating the clearance or fly height, generating a control voltage based on a difference between the estimated clearance or fly height and a desired clearance or fly height and coupling the control voltage to a shear transducer coupled between the read/write head and a slider to cause the shear transducer to shear and move the read/write head relative to the slider.

11. The method of claim 10 wherein the coupling step comprises coupling a voltage difference across a piezoelectric layer coupled between the read/write head and a slider to cause the piezoelectric layer to shear and move the read/write head relative to the slider.

12. The method of claim 10 further comprising steps of:
    (d) positioning a slider over the patterned media, the slider being coupled to the read/write head by a shear transducer;
    (e) estimating the clearance or fly height of the read/write head;
    (f) actively generating a control signal based on a difference between the estimated clearance or fly height and a desired clearance or fly height of the read/write head over the patterned media; and
    (g) applying the control signal to a shear transducer to move the read/write head relative to the slider.

13. The method of claim 12 wherein estimating step (e) comprises estimating the clearance or fly height of the read/write head based on a read/write signal generated by the read/write head that changes due to a magnetoresistive thermo-cooling effect in the read/write head.

14. The method of claim 10 further comprising steps of:
    (h) generating a map of ridges and grooves in the patterned media;
    (i) storing the map in a computer-readable medium;
    (j) retrieving information about the patterned media from the map as the disc is rotating; and
    (k) actively controlling the clearance or fly height of the read/write head based on the information in the map.

* * * * *